United States Patent
Barthold

(10) Patent No.: US 6,861,825 B2
(45) Date of Patent: Mar. 1, 2005

(54) HYBRID AC/DC SYSTEM FOR ELECTRIC POWER TRANSMISSION

(76) Inventor: Lionel O. Barthold, 10 Wood's Point La., Lake George, NY (US) 12845-5407

(*) Notice: Subject to any disclaimer, the term of this patent is extended or adjusted under 35 U.S.C. 154(b) by 0 days.

(21) Appl. No.: 10/850,650

(22) Filed: May 21, 2004

(65) Prior Publication Data

US 2004/0232894 A1 Nov. 25, 2004

Related U.S. Application Data

(63) Continuation-in-part of application No. 10/345,598, filed on Jan. 16, 2003, now Pat. No. 6,804,128.

(51) Int. Cl.$^7$ .................................................. G05F 1/70
(52) U.S. Cl. ......................................................... 323/207
(58) Field of Search ................................. 323/205, 207, 323/907; 361/103

(56) References Cited

U.S. PATENT DOCUMENTS

| | | | | |
|---|---|---|---|---|
| 3,581,152 A | * | 5/1971 | Hunt | 361/50 |
| 4,727,466 A | | 2/1988 | Sakai | 363/35 |
| 5,420,495 A | | 5/1995 | Hingorani | 323/218 |
| 5,952,816 A | | 9/1999 | Larsen | 323/215 |
| 5,999,388 A | | 12/1999 | Asplund | 361/58 |
| 6,255,806 B1 | | 7/2001 | Seppanen et al. | 323/210 |
| 6,356,472 B1 | | 3/2002 | Runkle et al. | 363/170 |
| 6,552,598 B2 | | 4/2003 | Gelman | 327/453 |
| 6,714,427 B1 | * | 3/2004 | Barthold | 363/51 |
| 6,804,128 B2 | * | 10/2004 | Barthold | 363/51 |

* cited by examiner

Primary Examiner—Adolf Berhane
(74) Attorney, Agent, or Firm—Brian M. Dingman, Esq.; Mirick, O'Connell, DeMallie & Lougee, LLP

(57) ABSTRACT

A systematic, time-varying current is applied to any number of transmission conductors while the voltage on each remains at an essentially constant level but periodically reversed in polarity. Variations in current, from high to low and from positive to negative, are timed to coordinate with the thermal time constant of the conductor or cable. Current is interrupted on each conductor for a short period around a zero value to allow reversal of voltage. This invention allows full thermal utilization of each conductor in the system while gaining the advantage afforded by sustained DC voltage.

20 Claims, 3 Drawing Sheets

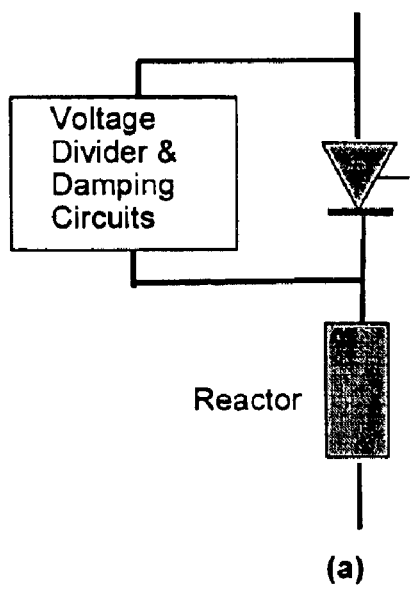 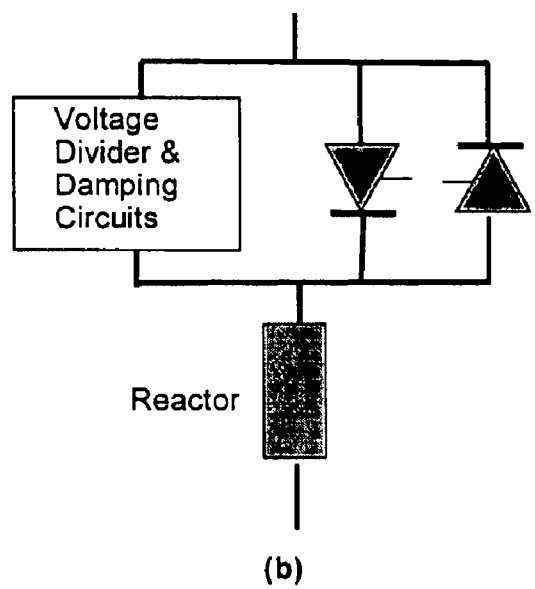
(a)                  (b)
Figure 2A: Prior Art        Figure 2B

HYBRID AC/DC SYSTEM FOR ELECTRIC POWER TRANSMISSION

CROSS REFERENCE TO RELATED APPLICATION

This application claims priority of and is a continuation-in-part of patent application Ser. No. 10/345,598, filed on Jan. 16, 2003 now U.S. Pat. No. 6,804,128.

FIELD OF THE INVENTION

This invention relates to both AC and DC transmission of electric power.

BACKGROUND OF THE INVENTION

Electric power systems planners have long accepted high voltage direct current (HVDC) as an attractive alternative to conventional three-phase high voltage AC in certain circumstances. HVDC lines are less expensive than AC lines. The classical economic case for HVDC is made when the savings in line costs are sufficient to offset the rectifier and inverter stations to convert AC to HVDC at the sending end and back to AC at the receiving end. Since HVDC terminals are expensive, applications usually involve longer than normal distances. The economic break-even distance varies greatly from one situation to another but may be in the order of 500 to 800 kM for overhead and one tenth that for underground or under water cables.

There are other advantages to HVDC; primarily the fact that the power transfer can be easily controlled and that short circuit current is much lower; an especially important consideration for metropolitan systems. HVDC is also more efficient in that it uses the insulating strength of the line or cable continuously rather than only during crest voltage as with AC. Thus for the same level of insulation, continuous DC voltage can be at least $\sqrt{2}$ times the rms AC voltage, power transfer being increased by the same ratio. The increase in DC voltage can be even greater than that since HVDC systems do not require the same additional margin for over-voltages which occur at switching.

The resistance of conductors is also slightly lower for DC current inasmuch as electric fields associated with power frequency AC current forces the current distribution to favor the outer periphery of a conductor. With DC or very low frequency AC, the current distribution is more uniform so the electrical resistance is less.

The above intrinsic characteristics can result in an HVDC conductor transmitting on the order of 60% more power than the same conductor and same insulation in an AC system. However, it's important to note that the power which flows in an AC line may fall far short of it's intrinsic thermal capability, being limited by broader system concerns such as stability, voltage control, reactive power transport, and the fact that actual flow is determined by the system context rather than by controls. For example, a line which is paralleled by several much higher capacity lines may carry very little load in spite of its ability to do so.

HVDC has historically and naturally evolved around a transmission system which uses one conductor for positive voltage and current and another for negative voltage and the equal and opposite return current. This is referred to as bi-pole transmission. Each pole, positive and negative, is equipped with its own mono-pole bridge. The thyrister configuration within a conventional mono-pole bridge is shown in FIG. 2A. Under normal operating conditions all of the return current is in the second pole, none in the ground.

Some lines have been built with one pole only, in which all return current flows in the ground or a metallic ground wire. In most bipolar lines a separate conductor (or pair of them) is provided so that when one pole is forced out of service, the other can continue to operate. In that state the line operates at half power.

SUMMARY OF THE INVENTION

The invention comprises a system and method which causes three or more conductors to operate under full DC Voltage while controlling current to vary with time in such fashion as to assure that the net power transfer on each conductor is the same as would be carried were that conductor part of a bipolar system. Thus total transmitted power increases proportionately with the number of conductors used.

This invention features a method of transmitting power though a transmission system comprising three or more conductors and associated terminal equipment, all subject to a DC voltage, wherein each conductor and its associated terminal equipment has a nominal thermal limit to its current-carrying capacity. In one embodiment, the method comprises transmitting current over one or more of the conductors and each such conductor's associated terminal equipment at a level which may be temporarily above the nominal thermally-limited current-carrying capacity of each conductor and its associated terminal equipment, and at an essentially constant voltage, returning the transmitted current through the remaining conductors and their associated terminal equipment, wherein the total transmitted and return currents are nominally equal, and periodically altering the current level among the conductors and their associated terminal equipment so as to rotate higher and lower levels of current among the conductors and their associated terminal equipment, such that, over time, the resistance heating of none of the conductors and none of the associated terminal equipment exceeds its thermal limit.

Each of the conductors and its associated terminal equipment may transmit current above thermal limit for a time which is nominally less than the thermal time-constant of either the conductor or its associated terminal equipment so as to prevent overheating within the period of rotation of high and low currents. Each conductor and its associated terminal equipment may carry a high level current for a fraction of time equal to the ratio of that conductor to the total number of conductors or conductor groups and a lower level of current for a fraction of time substantially equal to 1 minus that fraction.

The polarity of the essentially constant DC voltage and time-varying current in each conductor and its associated terminal equipment may be systematically and simultaneously reversed in order to maintain an essentially continuous power flow in the same direction. In this case, the time-varying current flow in each conductor and associated terminal equipment may be switched periodically between one or more positive values of transmitted current for a period of time, zero for a second amount of time, and one or more negative values of return current for a third amount of time. The first and third amounts of time may be approximately equal, and the second may be shorter than the first and third amounts of time and long enough to accommodate switching of pole polarity. The time-varying current may be interrupted briefly prior to changing direction.

For any conductor and its associated terminal equipment the average of the square of each level of current multiplied by the time it is carried may be no more than the product of the sum of said time periods and the square of that continuous DC current which could be carried without exceeding the thermal limit of that conductor or its associated terminal equipment. The magnitude of current transmitted and returned in each conductor and its associated terminal equipment may be controlled to be in the form of a low frequency AC sinusoid while the voltage is controlled by means of anti-parallel rectifier and inverter devices to have an essentially constant DC value, periodically reversed in polarity, thus creating a hybrid AC-DC system for transmission of electric power.

The power transmission method may further comprise means for converting AC to DC before transmission, and converting DC to AC after transmission. The switching may be accomplished using a series of mono-pole converters equal to the number of conductors, or a cyclo-converter configuration with valve clusters equal to the number of conductors. There may be one such mono-pole converter for each conductor, or one cyclo-converter with one valve cluster for each conductor. The rectifying and inverting valve of mono-converters or cyclo-converter configurations may comprise two thyristers connected in anti-parallel.

The switching may be accomplished such that the reversals of current occur at different times on each conductor and its associated terminal equipment. On any conductor and its associated terminal equipment, the interruption of current may occur at a time of its minimum magnitude and, further, power transfer on that conductor and associated terminal equipment is interrupted for a period of time very short compared to the period of rotation of current maximum among all conductors and their associated terminal equipment. The switching may be accomplished such that the current in each conductor and its associated terminal equipment increases in a step-wise manner, and decreases in a step-wise manner. Conductors consisting of solid insulation may be reversed in polarity frequently enough to prevent migration of free charge. The build-up of pollution on exposed insulation may be inhibited by periodic reversal of polarity, thereby allowing the use of AC insulators for DC voltage. Equipment which converts AC current to DC and inverts DC current to AC may be used for the conductors and associated terminal equipment, while taking full advantage of the insulation capability and thermal limits of each.

This invention also features a system for transmitting power by means of DC voltage, though a transmission system comprising three or more conductors and associated terminal equipment, wherein each conductor and its associated terminal equipment has a nominal thermal limit to its current-carrying capacity. The system includes means for transmitting time-varying current though one or more of the conductors and each such conductor's associated terminal equipment at a level which may be temporarily above the nominal thermally-limited current-carrying capacity of each conductor and its associated terminal equipment, and at essentially constant voltage, means for returning the transmitted current though the remaining conductors and their associated terminal equipment, wherein the total transmitted and return currents are nominally equal, and means for periodically changing the current level in the conductors so as to rotate the higher level current among the conductors and their associated terminal equipment such that, over time, the resistance heating of the conductors and associated terminal equipment does not exceed the thermal limits of any conductor or its associated terminal equipment.

BRIEF DESCRIPTION OF THE DRAWINGS

The nature of the invention can best be understood by the following detailed description taken in conjunction with the accompanying drawings in which:

FIG. 2A is a schematic diagram of a prior art single thyrister valve element;

FIG. 2B is a schematic diagram of two thyrister valve elements in anti parallel to permit simultaneous reversal of voltage and current, for use in the invention.

PREFERRED EMBODIMENTS OF THE INVENTION

The invention would be embodied by constructing or operating DC transmission line having more than two active conductors and by using a bridge configuration capable of producing a reversing DC voltage and sinusoidal or quasi-sinusoidal low frequency AC current.

Figure 1:
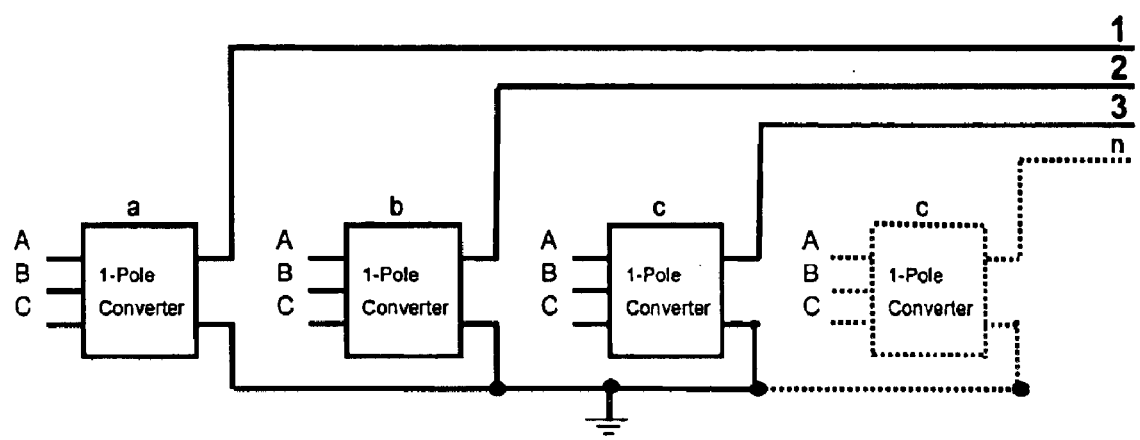
FIG. 1 is a schematic diagram of a rectifier or inverter terminal for the invention.

The preferred equipment used in the invention comprises an array of mono-pole bridge elements, as shown in FIG. 1, wherein each serves a separate conductor in an n-conductor transmission line, where n can be any number greater than 2. The following discussion will dwell principally on the case where n=3, though the extension to larger numbers of conductors is apparent and included within the scope of the invention.

The invention consists, in part, of causing the current in each pole, under full DC voltage, to vary regularly and systematically with time such that (a) at any given time the sum of positive and negative currents in all poles is zero, (b) the sum of the square of current during any interval times the length of that interval is equal to the product of that continuous current which corresponds to thermal limits times the sum of all time intervals and (c) the reversal of polarity in any pole occurs when other poles sustain a high level of current. A sinusoidal current or stepped approximation to a sinusoidal current is a special case meeting those conditions. In the sinusoid case, positive crest values of current in various poles are offset from one another electrically by $2\Pi/n$ radians, where n is the number of conductors used. For a three pole system, illustrated in FIG. 3, the wave forms are offset by $2\Pi/3$ radians or 120 electrical degrees. Thus, current zero for each pole occurs at a different time.

Figure 3:
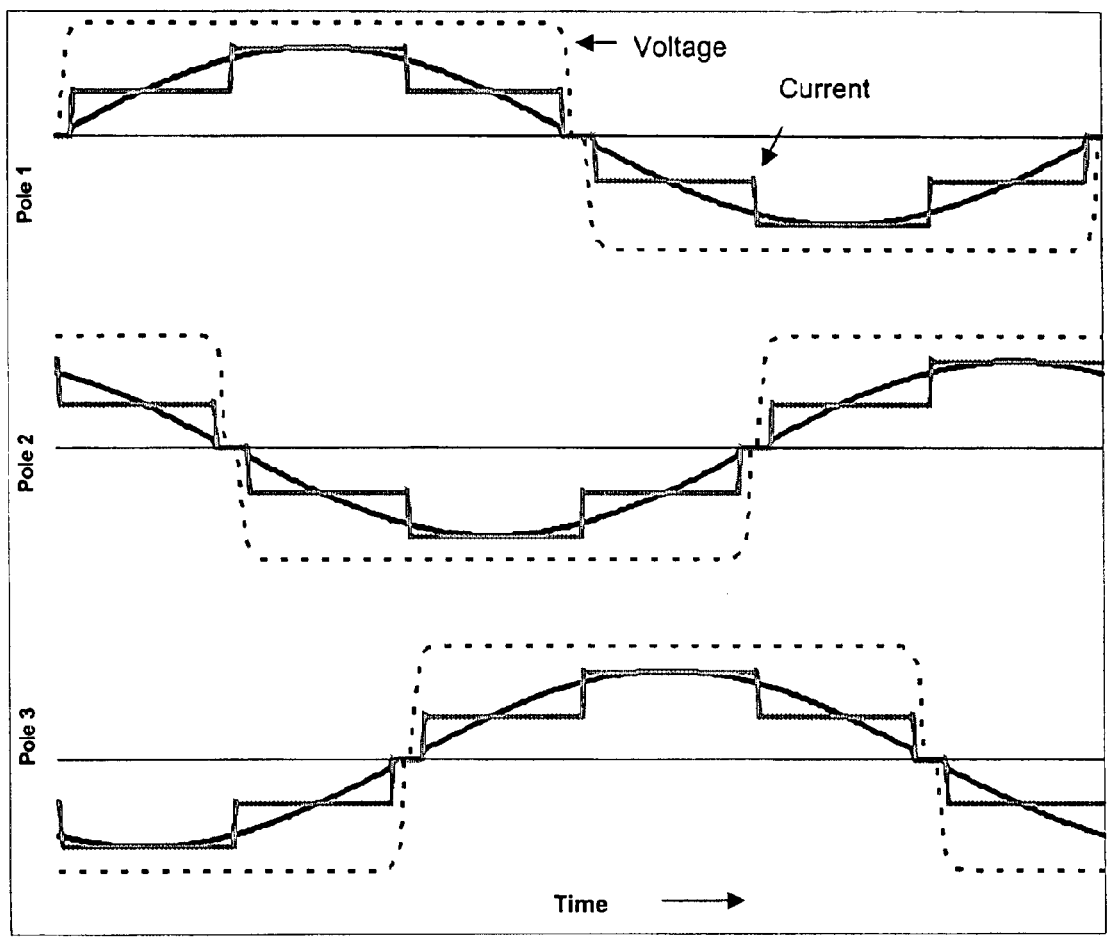
FIG. 3 illustrates examples of the current and voltage cycling of the preferred embodiment of the invention for a three-conductor embodiment.

FIG. 3 illustrates two preferred current modulation patterns for the invention. One modulation is sinusoidal, and the other is a stepped modulation that is essentially sinusoidal. In each case, at any given time the transmitted and return currents are essentially equal. When the current flow changes direction in each conductor and its associated equipment, for a brief period of time the current is interrupted. This accommodates the reversal of voltage at the same time, as shown by the dashed line.

Average power transfer on each pole is the product of DC voltage and rms current, and would be the same as though a DC current nominally equal to the rms value, were flowing continuously. In application of this system, the heating effect ($I^2R$) in both conductors and terminal equipment would also be rms current, and no overheating would occur so long as the period of the low frequency current wave is shorter than the thermal time constant of those lines and equipment components. In the case of overhead lines the period could easily be in the order of minutes, in underground cable a great deal longer but for the limitations imposed by its terminal equipment.

The exception to the foregoing is the thyrite element in each preferred valve, the latter being more sensitive to instantaneous than rms current. Thus for the same power rating per pole as with a bi-pole scheme, the thyrite element in valves would have to be rated for a current √2 higher than for the case where the same power is transmitted by continuous DC current.

In order that reversals of current not result in simultaneous reversal in the direction of power flow, DC voltage applied to each pole must be reversed at the same time its current is reversed. Thus, the thyrister elements in each valve must be doubled, each pair being connected in anti-parallel as shown in FIG. 2B. Other components of a valve assembly, e.g. grading resisters, damping circuits, and cooling system could be common to both thyristers.

HVDC circuits, both overhead and underground, are normally capable of reversing power flow by reversals of voltage. That reversal cannot be achieved in any less than the order of 100 milliseconds for overhead lines and longer for underground cables. By staggering current zeros in each pole however, the invention provides a convenient interval, at minimum power flow during which the current in each pole can be set to zero and the polarity reversed. Inasmuch as the frequency can be very low, e.g. the order of 5 milliHerz (period of 3.33 minutes for each full current cycle, 1.67 minutes for a heating cycle) ample time for voltage reversal is afforded with just a few electrical degrees of current interruption. Reversal of voltage on cable circuits takes more time but in like manner the thermal time constant is much longer.

The invention can be applied to advantage on projects where conventional bi-polar DC transmission is justified. The invention would require adding one or more additional conductors to the system. While economics will vary from case to case, four factors favor adaptation of the invention, and its additional conductor requirement, over conventional bi-pole transmission:

1. The increase in DC line cost by going from two conductors to three, thereby enabling a 50% increase in utilization of line investment, is in many cases very slight, particularly where right of way costs are very high or where a metallic ground return conductor is already provided for in tower design. Thus on a per kW basis, transmission costs drop by almost two thirds.
2. For projects where HVDC is attractive, the line cost is often greater than the terminal costs by a factor of two or more.
3. The advantage per kW of line cost will often more than off-set the increase in per kW cost of terminal costs, the latter increased by the valve arrangements required by the invention.
4. In the di-pole case, loss of one pole reduces capacity to one half. In a tri-pole case embodying the invention, loss of one pole reduces capacity to two thirds, thus providing a 33% increase in first contingency power transfer capacity. If a metallic ground return were added to the three pole conductors, redundancy would be further increased in that transfer would drop to ⅔ with one pole out of service and down to ⅓ with two of three poles out of service.

Essentially the same economic arguments apply to underground or submarine cable systems once HVDC has been justified. For example, many major cable circuits are forced to divide total capacity between two bi-pole circuits in order to accommodate the loss of one pole. Even greater reliability can be achieved by the invention if the same capacity is supplied on three circuits; again affording 33% more power with one pole out that in the double bi-pole scheme.

Conversion of Existing AC Circuits by Means of the Invention

The case for conversion of AC lines or cables, already equipped with three conductor positions, to DC becomes more interesting by virtue of the invention in that, unlike bi-pole conversion schemes, all three existing conductors can be used to their full thermal capability.

That benefit notwithstanding, the cost per incremental kW of advantage gained by conversion is high in either case since both the original and new capacity must be converted. If conversion doubles the useful capacity, the cost per incremental kW would be twice as high as for a new circuit. If conversion triples capacity, the multiplier would be 1.5. Thus, both the ratio of post-conversion to pre-conversion power and the cost of new, parallel lines are critical and may limit application to lines or cables which, at present, are able to carry only a small fraction of their AC thermal capability or where the only alternative to uprating by HVDC conversion involves new generating capacity.

Because the tri-pole scheme periodically reverses voltage, it will very likely inhibit accumulation of contaminating particles just as conventional AC does, thereby eliminating the need for specially-designed insulators.

Conversion of existing AC underground or submarine systems follows somewhat the same arguments, though with additional considerations. Most presently installed solid insulation cables, for example, cannot be used for HVDC because over a long period of time at one polarity, free charge migrates within the insulation and distorts the original voltage gradient. Sudden voltage reversal then causes uncommonly high internal stress and risks insulation failure. The hybrid system described in the invention reverses voltage regularly and more rapidly than the migration time constant of free charge.

Many existing high voltage cables place three paper-insulated conductors in a common oil-filled pipe. A short circuit on one conductor carbonizes the oil rendering it unsafe for the remaining two to operate. DC schemes limit current during faults and may allow operation of the remaining two conductors in thy hybrid scheme described above, unless harmonic coupling is sufficient to sustain fault current.

Other embodiments will occur to those skilled in the art and are within the following claims:

What is claimed is:

1. A method of transmitting power though a transmission system comprising three or more conductors and associated terminal equipment, all subject to a DC voltage, wherein each conductor and its associated terminal equipment has a nominal thermal limit to its current-carrying capacity, the method comprising:

transmitting current over one or more of the conductors and each such conductor's associated terminal equipment at a level which may be temporarily above the nominal thermally-limited current-carrying capacity of each conductor and its associated terminal equipment, and at an essentially constant voltage;

returning the transmitted current through the remaining conductors and their associated terminal equipment, wherein the total transmitted and return currents are nominally equal; and periodically altering the current level among the conductors and their associated terminal equipment so as to rotate higher and lower levels of current among the conductors and their associated terminal equipment, such that, over time, the resistance heating of none of the conductors and none of the associated terminal equipment exceeds its thermal limit.

2. The power transmission method of claim 1 wherein each of the conductors and its associated terminal equipment transmits current above thermal limit for a time which is nominally less than the thermal time-constant of either the conductor or its associated terminal equipment so as to prevent overheating within the period of rotation of high and low currents.

3. The power transmission method of claim 1 wherein each conductor and its associated terminal equipment carries a high level current for a fraction of time equal to the ratio of that conductor to the total number of conductors or conductor groups and a lower level of current for a fraction of time substantially equal to 1 minus that fraction.

4. The power transmission method of claim 1 wherein the polarity of the essentially constant DC voltage and time-varying current in each conductor and its associated terminal equipment is systematically and simultaneously reversed in order to maintain an essentially continuous power flow in the same direction.

5. The power transmission method of claim 4 wherein the time-varying current flow in each conductor and associated terminal equipment is switched periodically between one or more positive values of transmitted current for a period of time, zero for a second amount of time, and one or more negative values of return current for a third amount of time.

6. The power transmission method of claim 5 wherein the first and third amounts of time are approximately equal and the second is shorter than the first and third amounts of time and long enough to accommodate switching of pole polarity.

7. The power transmission method of claim 6 wherein the time-varying current is interrupted briefly prior to changing direction.

8. The power transmission method of claim 1 wherein, for any conductor and its associated terminal equipment the average of the square of each level of current multiplied by the time it is carried is no more than the product of the sum of said time periods and the square of that continuous DC current which could be carried without exceeding the thermal limit of that conductor or its associated terminal equipment.

9. The power transmission method of claim 1 wherein the magnitude of current transmitted and returned in each conductor and its associated terminal equipment is controlled to be in the form of a low frequency AC sinusoid while the voltage is controlled by means of anti-parallel rectifier and inverter devices to have an essentially constant DC value, periodically reversed in polarity, thus creating a hybrid AC-DC system for transmission of electric power.

10. The power transmission method of claim 1 further comprising means for converting AC to DC before transmission, and converting DC to AC after transmission.

11. The power transmission method of claim 1 wherein the switching is accomplished using a series of mono-pole converters equal to the number of conductors, or a cyclo-converter configuration with valve clusters equal to the number of conductors.

12. The power transmission method of claim 11 wherein there is one mono-pole converter for each conductor, or one cyclo-converter with one valve cluster for each conductor.

13. The power transmission method of claim 11 wherein the rectifying and inverting valve of mono-converters or cyclo-converter configurations comprise two thyristers connected in anti-parallel.

14. The power transmission method of claim 1 wherein the switching is accomplished such that the reversals of current occur at different times on each conductor and its associated terminal equipment.

15. The power transmission method of claim 14 wherein, on any conductor and its associated terminal equipment, the interruption of current occurs at a time of its minimum magnitude and, further, power transfer on that conductor and associated terminal equipment is interrupted for a period of time very short compared to the period of rotation of current maximum among all conductors and their associated terminal equipment.

16. The power transmission method of claim 14 wherein the switching is accomplished such that the current in each conductor and its associated terminal equipment increases in a step-wise manner, and decreases in a step-wise manner.

17. The power transmission method of claim 1 wherein conductors consisting of solid insulation are reversed in polarity frequently enough to prevent migration of free charge.

18. The power transmission method of claim 1 wherein the build-up of pollution on exposed insulation is inhibited by periodic reversal of polarity, thereby allowing the use of AC insulators for DC voltage.

19. The power transmission method of claim 1 wherein equipment which converts AC current to DC and inverts DC current to AC is used for the conductors and associated terminal equipment, while taking full advantage of the insulation capability and thermal limits of each.

20. A system for transmitting power by means of DC voltage, though a transmission system comprising three or more conductors and associated terminal equipment, wherein each conductor and its associated terminal equipment has a nominal thermal limit to its current-carrying capacity, comprising:

means for transmitting time-varying current though one or more of the conductors and each such conductor's associated terminal equipment at a level which may be temporarily above the nominal thermally-limited current-carrying capacity of each conductor and its associated terminal equipment, and at essentially constant voltage;

means for returning the transmitted current though the remaining conductors and their associated terminal equipment, wherein the total transmitted and return currents are nominally equal; and means for periodically changing the current level in the conductors so as to rotate the higher level current among the conductors and their associated terminal equipment such that, over time, the resistance heating of the conductors and associated terminal equipment does not exceed the thermal limits of any conductor or its associated terminal equipment.

* * * * *